(12) United States Patent
Rieken

(10) Patent No.: US 9,499,408 B2
(45) Date of Patent: Nov. 22, 2016

(54) GRAPHENE SHEETS AND METHODS FOR MAKING THE SAME

(71) Applicant: TRUE 2 MATERIALS PTE LTD, Singapore (SG)

(72) Inventor: William Rieken, Singapore (SG)

(73) Assignee: TRUE 2 MATERIALS PTE LTD, Singapore (SG)

( * ) Notice: Subject to any disclaimer, the term of this patent is extended or adjusted under 35 U.S.C. 154(b) by 0 days.

(21) Appl. No.: 14/424,495

(22) PCT Filed: Sep. 4, 2013

(86) PCT No.: PCT/IB2013/058278
§ 371 (c)(1),
(2) Date: Feb. 27, 2015

(87) PCT Pub. No.: WO2014/037882
PCT Pub. Date: Mar. 13, 2014

(65) Prior Publication Data
US 2015/0210552 A1    Jul. 30, 2015

(30) Foreign Application Priority Data

Sep. 4, 2012   (GB) .................................. 1215766.5

(51) Int. Cl.
*C01B 31/04* (2006.01)
*C04B 35/52* (2006.01)
*C04B 35/622* (2006.01)
*B82Y 30/00* (2011.01)
*B82Y 40/00* (2011.01)

(52) U.S. Cl.
CPC ............ *C01B 31/0446* (2013.01); *B82Y 30/00* (2013.01); *B82Y 40/00* (2013.01); *C01B 31/043* (2013.01); *C01B 31/0476* (2013.01); *C04B 35/522* (2013.01); *C04B 35/62218* (2013.01); *C01B 2204/02* (2013.01); *C01B 2204/28* (2013.01);
(Continued)

(58) Field of Classification Search
CPC ............... C01B 31/0446; C01B 31/043; C01B 31/0476; C01B 2204/02; C01B 2204/28; C04B 35/522; C04B 35/62218; C04B 2235/606; B82Y 30/00; B82Y 40/00; Y10T 428/265
USPC ........................................................ 423/448
See application file for complete search history.

(56) References Cited

U.S. PATENT DOCUMENTS 8,052,812 B2 * 11/2011 Kariya ..................... C21D 8/02
                                                        148/330
8,071,018 B2 * 12/2011 Kariya ................... C21D 6/004
                                                        148/330
(Continued)

FOREIGN PATENT DOCUMENTS

KR       20120049820 A      5/2012

OTHER PUBLICATIONS

International Search Report and Written Opinion for PCT/IB2013/058278 dated Jan. 31, 2014 (11 pages).
(Continued)

*Primary Examiner* — Daniel C McCracken
(74) *Attorney, Agent, or Firm* — Kilpatrick Townsend & Stockton LLP

(57) ABSTRACT

The invention relates to graphene sheets and to a method for making the same in which a solution of graphene or graphite oxide is applied to a blue steel substrate and dried.

13 Claims, 3 Drawing Sheets

(52) U.S. Cl.
CPC ...... *C04B 2235/606* (2013.01); *Y10T 428/265* (2015.01); *Y10T 428/30* (2015.01)

(56) References Cited

U.S. PATENT DOCUMENTS

| | | | |
|---|---|---|---|
| 2011/0227000 A1* | 9/2011 | Ruoff | B82Y 30/00 252/502 |
| 2012/0012796 A1* | 1/2012 | Chen | B82Y 30/00 252/502 |
| 2013/0156678 A1* | 6/2013 | Banerjee | B82Y 30/00 423/445 R |

OTHER PUBLICATIONS

Fei Liu et al., "Large scale synthetic method for free standing graphene film and graphene sponges", Nanotechnology, Aug. 17, 2010, Piscataway, NJ, pp. 696-699.

\* cited by examiner

GRAPHENE SHEETS AND METHODS FOR MAKING THE SAME

CROSS REFERENCE TO RELATED APPLICATIONS

This application is the National Stage of International Application No. PCT/IB2013/058278, filed Sep. 4, 2013, which claims priority to United Kingdom Application No. 1215766.5, filed Sep. 4, 2012, which are incorporated by reference herein in their entirety.

FIELD OF INVENTION

The invention relates to graphene sheets and methods for making the same.

BACKGROUND OF INVENTION

Graphene is a molecule comprising a single layer of carbon atoms bound together, typically by sp2 bonds, in the form of a hexagonal structure. Graphene has a number of desirable thermal and mechanical properties, including high thermal conductivity (5,000 W/mK), high-electron carrying capacity at room temperature (250,000 $cm^3$/Vs), high tensile strength, and high mechanical stability, with Young's modulus of 1 TPa. The properties of graphene make it useful in a large number of applications, such as sensors, batteries, supercapacitors, hydrogen storage systems and as reinforcement fillers of nanocomposites.

Graphene sheets can be in the form of single or multiple layers of graphene however the current methods for making graphene sheets are limited.

Existing methods for preparing graphene sheets include, chemical vapour deposition (CVD) onto a metal (i.e. foil) substrate, chemical exfoliation, mechanical exfoliation of graphite, epitaxial growth, carbon nanotube cutting and direct sonication. These methods all have their own advantages and disadvantages, particularly with regards to cost and scalability. Current methods require extensive filtering, chemical separation processes, chemical etching processes and other environmentally unclean steps to create a functional material. In addition these methods are not well suited for large scale manufacturing.

SUMMARY OF THE INVENTION

The invention generally resides in providing a simplified method that can be easily scaled up to produce graphene sheets.

According to one aspect of the invention there is provided a method for making a graphene sheet, the method comprising:

applying a graphene or graphite oxide solution to a blue steel substrate; and drying the solution to form the graphene sheet on the substrate.

The terms "graphene sheet" or "graphene oxide sheet" as used herein can include molecules having a single layer of aromatic polycyclic carbon atoms that are covalently bound to each other. The terms "graphene sheet" or "graphene oxide sheet" also include molecules in which several, i.e., two, three, four, five to ten, one to twenty, one to fifty, or one to hundred, single layers of carbon atoms are stacked on top of each other without reverting back to carbon. Therefore the terms "graphene sheet" or "graphene oxide sheet" as used herein refer to a single layer of aromatic polycyclic carbon as well as to a plurality of such layers stacked upon one another.

The method can be used to form single or multiple layer sheets. Preferably the graphene sheets comprise one to hundred layers of carbon atoms. More preferably the graphene sheets comprises one to twenty layers, more preferably one to twenty layers, more preferably two to ten layers. Particularly preferred sheets have 2, 3, 4 or 5 layers of carbon atoms.

Exemplary graphene sheets formed by the method of the invention may comprise between 1 and 30 atomic layers. Such sheets have a corresponding thickness of about 1 nm to about 100 nm. Preferably the sheets can have a thickness of 1 to 50 nm and more preferably a thickness of 2 to 10 nm. Particularly preferred sheets have a thickness of 2 nm, 3 nm, 4 nm or 5 nm. The thickness of the sheets formed can depend on the number of layers that the sheets comprise.

In one embodiment of the invention the graphene sheet is a single layer sheet. Preferably the sheet has a thickness of about 1 nm. Different thicknesses for single layer graphene have been reported, ranging from 0.35 nm to 1 nm (Nemes-Incze et al., 2008, *Carbon*, 46(11):1435-1442). The present inventors have measured graphene sheets to be 1 nm per layer.

In another embodiment the graphene sheet is a multiple layered sheet. Although technically there is no limit to the number of graphene sheets which may be stacked, in practice a point is reached where graphene stacking reverts the graphene back to graphite. Preferably the multiple layered sheet has a thickness that does not result in reversion back to graphite. Preferably the multi-layered sheet can have a thickness of up to 100 nanometers.

The thickness of the sheet produced by the method can be varied. Ways of varying the sheet thickness include controlling the formation of the droplet size of the solution applied to the blue steel substrate when using a drop casting technique to apply the solution and/or controlling the graphite oxide concentration in the solution. Droplet size may be controlled using solution density, needle size and shape (dependent upon dispensing equipment), shaped and tuned electric fields and a combination thereof. To achieve 2 to 3 atom layer thicknesses, a preferred concentration of about 2 mg of graphene or graphite oxide per 100 ml of $H_2O$. To achieve thicker layers the solution is adjusted to between 3 mg to 6 mg of graphene or graphene oxide per 100 ml of $H_2O$. Experiments show that 0.1 to 1.5 mg of graphene or graphene oxide per 100 ml $H_2O$ will be required to achieve a single atom layer.

Without wishing to be bound by any particular theory, the inventors believe that using blue steel as a metal substrate on which to form the graphene sheets assists in the release of the sheets formed on the substrate. Blue steel is a steel alloy comprising nickel and chromium and has a spheroidized carbon structure and is available commercially from a number of manufacturers, including JFE. Blue steel is further described in U.S. Pat. No. 8,071,018 and U.S. Pat. No. 8,052,812, the contents of which are incorporated herein by reference.

The graphene or graphite oxide solution can be prepared by any suitable method. The solution prepared can depend on the desired functionality of the graphene sheet, the time required to process the sheets, and the surface tension between the graphene sheets and blue steel substrate it is prepared on.

One method for preparing a graphite oxide solution involves subjecting graphite to an oxidative treatment. One such oxidative treatment process involves placing graphite in a flask and adding concentrated sulphuric acid. The mixture is then cooled. Potassium permanganate is added to the cooled mixture in small portions over time. Following the addition of the $KMnO_4$ the mixture is stirred at 35° C. for 2 hours. After the two hour period, water is added to the reaction mixture and stirring is continued. The reaction mixture is then poured into water and excess $KMnO_4$ is neutralized by adding a sufficient amount of an aqueous solution of hydrogen peroxide. Graphite oxide is recovered by filtration. The filtered graphite oxide is washed with an HCl solution until sulphates are no longer detected by a barium chloride test.

An oxidative treatment to produce graphite oxide is also described in Hummers et al, Journal of the American Chemical Society, 1958, vol. 80 p 1339. Other methods can also be used to prepare graphite oxide solution. Other methods for preparing graphite oxide solutions include but are not limited to Brodie's Method, and ultrasonic dispersion methods.

Preferably the graphite oxide is present in the solution at a concentration from about 0.1 mg/ml to 100 mg/ml.

The graphite oxide solution can further contain an ammonia solution. The ammonia can be present at a concentration of up to about 1% (v/v). Preferably less than 0.1% (v/v) of the graphite oxide solution is ammonia. Too much ammonium will impair the development of the graphite oxide solution when it is applied to the blue steel. When more than 1% (v/v) of the graphite oxide solution is ammonium, this can cause the solution to clump, reverting back to graphite, when applied to the blue steel substrate. Furthermore, over time the ammonia will react with the substrate and damage it. Drying times of longer than 24 hours with ammonia-based solutions is not recommended because the ammonia etches the substrate material. However the addition of small amounts of ammonium to the graphite oxide solution can enhance the release of the graphene sheet from the blue steel substrate.

The ammonia can be present in a concentration in the range from about 0.1 g/L to about 0.5 g/L.

Ammonium solution is added to the graphite oxide solution before the solution is applied to the blue steel substrate. The amount of ammonium to be used is dependant on the size of the graphite oxide particles in the solution. Preferred particle sizes range from 10 to 60 micrometers, however particle sizes down to 1 μm or less may also be used. The concentrations of the particles and the desired thickened of the final graphene sheet.

The solution can be applied to the blue steel substrate by drop casting. Other methods such as spray drying, spin coating may also be used.

The graphite oxide solution can be applied to the surface of the surface of the blue steel to form a film and dried. Drying can take place by air drying or other techniques. Preferably the graphene sheet is allowed to dry on the blue steel substrate for up to 32 hours. Preferably the sheets can be dried for up to 20 to 24 hours. Preferably the sheets are dried at room temperature or up to 35° C. Slow drying is recommended using this method so as not to cause bubbling in the solution which dislocates the graphene or graphene oxide crystals causing an uneven surface to be created. Although simple, air-drying can cause inconsistency in the material due to thermal variations and uncontrolled shrinkage. Other drying methods can be used to expedite the drying process.

In a particularly preferred embodiment drying is achieved using multi-frequency infrared radiation in a vacuum or in nitrogen gas. The drying method involves applying far, medium and short infrared frequencies with power in the range of 500 to 100 watts for 50 to 500 ns. When carried out under vacuum, the vacuum pressure is 3 kPa to 100 mPa. Alternatively, the method can be carried out under flow of dry nitrogen gas at 10 torr, 50 standard cubic centimeters per minute (sccm). Water vapour is captured in the gas phase by vapour absorbing materials, such as hydrogel crystals. A pulsed mode device that uses a mixture of far, middle and short infrared radiation may be used to quickly dry the materials within a short time frame, which is dependent upon the surface area of the sheet being created, without the creation of bubbling. With this technique it is possible to dry out the graphene within a few seconds to minutes giving the same results as air-drying but without the time factor and without a considerable shrinkage of the sheet material.

Bias voltage may be applied to the graphene sheets to control the growth of the graphene sheet. The direction of the bias voltage may be varied. A positive or negative bias can be applied to the sheet by the use of comb electrodes. An exemplary bias voltage is 100,000 to 2,000,000 kV at 0.001 A.

Other techniques for applying bias to graphene sheets can also be used. Controlling the growth of the sheets in this way increases the uniformity of the graphene platelets (crystals) that the sheet is composed of. This in turn improves the mechanical and physical characteristics of the material.

Once formed the graphene sheet can be removed from the blue steel substrate. The graphene sheet can be removed from the blue steel by hand (by peeling) or by mechanical peeling techniques already present in the newspaper, thin-film plastics, and electric condenser industries. Sheets of graphene oxide should be stored in moisture-free zones due to its ability to absorb water from the air. Alternatively, the sheets may be impregnated into a plastic material in which water vapour cannot penetrate. However, graphene sheets can be stored like any other plastic or thin metal materials. Both the graphene sheets and the graphene oxide sheets have the same texture and consistency of thin plastic food wraps, except in two ways, they are stronger and they don't change shape even after compression.

Once the sheets have been removed from the blue steel substrate the sheets may be further processed depending on their subsequent use. The sheets may be rolled, pressed, chemically treated etc, depending on their final usage. The sheets, once removed from the blue steel substrate, can be used in a variety of applications including in the fields of microelectronics, medical care, and construction.

According to another aspect of the invention a coated substrate comprises blue steel; and a graphene sheet on the blue steel substrate.

According to yet another aspect of the invention a graphene sheet is made from the method as described above.

BRIEF DESCRIPTION OF DRAWINGS

Embodiments of the invention shall now be described, by way of example only, with reference to the accompanying drawings in which.

DETAILED DESCRIPTION OF PREFERRED EMBODIMENT

Figure 1:
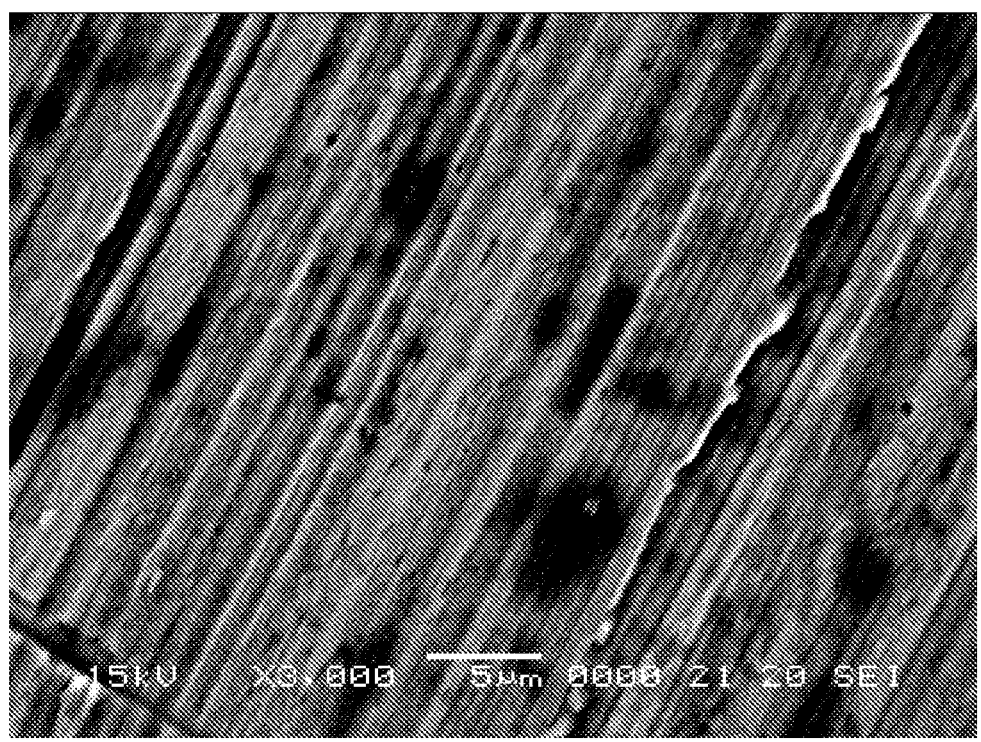
FIG. 1 shows a scanning electron micrograph of the blue steel substrate surface.
Figure 2:
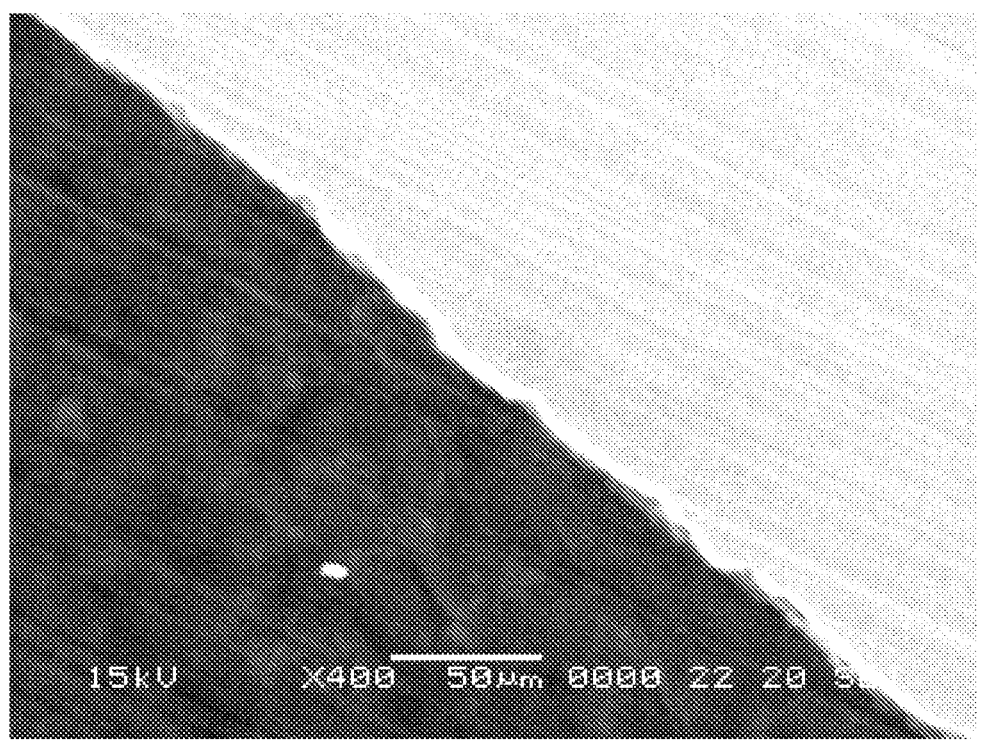
FIG. 2 shows a scanning electron micrograph of the substrate surface against a graphene oxide ridge.
Figure 3:
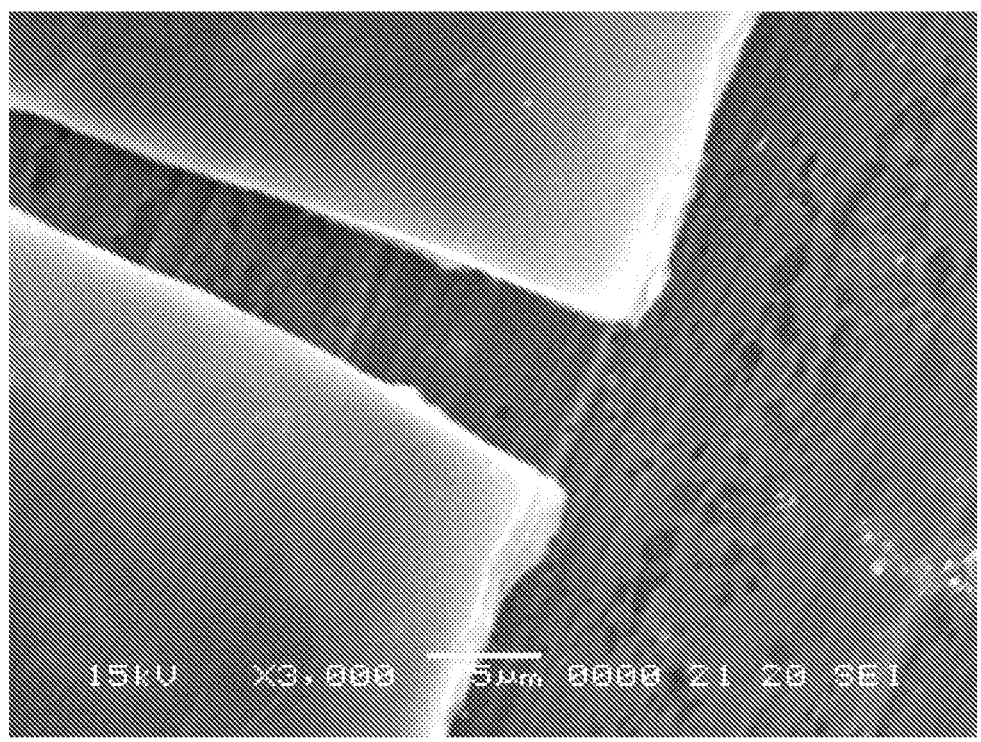
FIG. 3 shows a scanning electron micrograph of a three-layered graphene sample on the substrate.

The formation of the graphene sheets according to the invention comprises applying a graphite oxide solution to a substrate, preferably blue steel or a material with a similar physical spheroidized carbon structure. The physical properties of the blue steel result in the graphene sheet formed on the substrate being automatically released from the substrate as it dries. This means that that the graphene sheets formed start to release from the surface of the blue steel substrate without further treatment.

As the solution settles on the blue steel substrate several events are taking places: (a) the graphite oxide solution is collating (i.e., the carbon atoms are forming an ordered structure); (b) the solution is vaporising, (c) the graphene is settling upon the spheroidized structure of the blue steel substrate; (d) the spheroidized structure of the blue steel substrate is creating a uniform graphene sheet on its surface; and (e) the graphene sheet starts to separate from the substrate as the graphite oxide solution solidifies. The graphene sheet is then removed from the substrate and can be used as needed.

The structure of the blue steel allows the graphene sheet to be easily removed from its surface upon drying. The separation of the graphene sheets from the blue steel substrate upon drying is due to the expansion coefficient of the graphite oxide solution being much larger than that of the blue steel substrate. This assists in being able to remove the graphene sheet for subsequent uses. The structure of the blue steel can also assist in creating a uniform graphene sheet on the substrate.

Example 1

Preparation of Graphite Oxide Solution

A modified Hummer's method was used to prepare the graphite oxide solution. 0.5~6 g of graphite was added to a flask and then 100 ml of concentrated sulphuric acid was added. The mixture was cooled in an ice-water bath. The flask was maintained in the ice bath and 30 g of potassium permanganate was slowly added to the flask over 20 minutes while stirring. The ice bath was removed and the mixture was kept at an ambient temperature for 2 hours.

To the solution 230 ml of a 30% solution of $H_2SO_4$ and aqueous solution of hydrogen peroxide was added to the reaction solution with continuous stirring.

The reaction solution was further treated by centrifuging and washed with a dilute acidic solution (mixture of concentrated sulphuric acid/hydrogen peroxide or HCl) and distilled water to remove impurities from the reaction solution. The mixture was then dried for 3 days in a laboratory warmer.

The graphite oxide powder is dispersed in water to form a graphite oxide solution.

Example 2

A graphite oxide solution was prepared according to the process described in Example 1.

50 mg of the graphite oxide powder was dispersed in 1000 mL of deionized water. The dispersion was ultrasonically treated at 500 W for about 30 minutes.

The 0.05 mg/ml graphite oxide solution is drop cast onto the surface of the blue steel substrate.

A sheet 15 cm×3 cm was formed on the surface of the blue steel substrate and was allowed to air dry slowly for 24 hours. After the sheet was dried the graphene sheet formed was removed from the substrate by hand peeling.

The resistivity of the sheet was measured using a Mitsubishi Chemical Loresta-AX MCP-T370 4-probe resistance meter. Multiple resistivity values were obtained ($3.6 \times 10^6$, $5.7 \times 10^6$ and $6.2 \times 10^6$ ohm-cm). The inventors believe the inconsistency was due to the unevenness of the surface structure of the graphene sheet formed when using an air-drying method as described above.

Example 3

A 0.05 mg/ml graphite oxide solution was prepared according to the process of Example 2. A 0.3 g/L ammonium solution was added to the graphite oxide solution.

The graphite oxide solution with ammonium was deposited onto the surface of the blue steel substrate using standard drop casting techniques.

A sheet is formed on the surface of the blue steel substrate and was allowed to air dry for 24 hours. After the sheet had dried, the graphene sheet formed was removed from the substrate.

The addition of the ammonium solution was shown to enhance the release of the graphene sheet from the substrate.

Example 4

A graphite oxide solution was prepared according to the process described in Example 1.

3 g of the graphite oxide powder was dispersed in 1000 ml of deionized water. The dispersion was ultrasonically treated at 500 W for about 30 minutes.

The 3 mg/ml graphite oxide solution was deposited onto the surface of the blue steel substrate using standard drop-casting techniques A sheet was formed on the surface of the Blue steel substrate and was allowed to air dry for 32 hours. After the sheet had dried the graphene sheet formed was removed from the substrate.

Example 5

A 3 mg/ml graphite oxide solution was prepared according to the process of Example 4. A 0.1 g/l ammonium solution was added to the graphite oxide solution.

The graphite oxide solution with ammonium was deposited onto the surface of the blue steel substrate using standard drop casting techniques.

A sheet was formed on the surface of the Blue steel substrate and was allowed to air dry for 32 hours. After the sheet had dried the graphene sheet formed was removed from the substrate.

The addition of the ammonium solution was shown to enhance the release of the graphene sheet from the substrate. Some ammonia etching of the surface was detected.

Example 6

A graphite oxide solution was prepared according to the process described in Example 1.

6 g of the graphite oxide powder was dispersed in 1000 ml of deionized water. The dispersion was ultrasonically treated at 500 W for about 10 minutes.

The 6 mg/ml graphite oxide solution was deposited onto the surface of the blue steel substrate using standard drop-casting techniques A sheet was formed on the surface of the Blue steel substrate and was allowed to air dry for 20 hours. After the sheet had dried the graphene sheet formed was removed from the substrate. The thicker sheet formed during this experiment was found to damage the substrate due to rust creation.

Example 7

A 6 mg/ml graphite oxide solution was prepared according to the process of Example 6. A 0.1 g/L ammonium solution was added to the graphite oxide solution.

The graphite oxide solution with ammonium was deposited onto the surface of the blue steel substrate using standard drop casting techniques.

A sheet was formed on the surface of the blue steel substrate and was allowed to air dry for 20 hours. After the sheet had dried the graphene sheet formed was removed from the substrate.

The addition of the ammonium solution was shown to enhance the release of the graphene sheet from the substrate. As in Example 5, ammonia damage to the substrate surface was observed.

Example 8

A graphite oxide solution was prepared according to the process described in Example 1.

50 mg of the graphite oxide powder was dispersed in 1000 ml of deionized water. The dispersion was ultrasonically treated at 500 W for about 30 minutes.

The 0.05 mg/ml graphite oxide solution is drop cast onto the surface of the blue steel substrate.

A sheet 15 cm×3 cm was formed on the surface of the blue steel substrate and was dried using multi-frequency IR under vacuum. After the sheet was dried the graphene sheet formed was removed from the substrate by hand peeling.

Example 9

A graphite oxide solution was prepared according to the process described in Example 1.

50 mg of the graphite oxide powder was dispersed in 1000 ml of deionized water. The dispersion was ultrasonically treated at 500 W for about 30 minutes.

The 0.05 mg/ml graphite oxide solution is drop cast onto the surface of the blue steel substrate.

A sheet 15 cm×3 cm was formed on the surface of the blue steel substrate and was dried using multi-frequency IR under Nitrogen atmosphere. After the sheet was dried the graphene sheet formed was removed from the substrate by hand peeling.

Example 10

A graphite oxide solution was prepared according to the process described in Example 1.

50 mg of the graphite oxide powder was dispersed in 1000 ml of deionized water. The dispersion was ultrasonically treated at 500 W for about 30 minutes.

The 0.05 mg/ml graphite oxide solution is drop cast onto the surface of the blue steel substrate.

A sheet 15 cm×3 cm was formed on the surface of the blue steel substrate and was dried using multi-frequency IR under Nitrogen atmosphere. During drying a bias voltage was applied to the sheet using comb electrodes.

After the sheet was dried the graphene sheet formed was removed from the substrate by hand peeling.

The present invention is not to be limited in scope by the specific embodiments described herein. Indeed, various modifications of the invention in addition to those described herein will become apparent to those skilled in the art from the foregoing description and accompanying figures. Such modifications are intended to fall within the scope of the appended claims. Moreover, all embodiments described herein are considered to be broadly applicable and combinable with any and all other consistent embodiments, as appropriate.

Various publications are cited herein, the disclosures of which are incorporated by reference in their entireties.

The invention claimed is:

1. A method for making a graphene sheet, the method comprising:
   applying a graphene or graphite oxide solution to a steel alloy substrate comprising nickel and chromium and having a spheroidized carbon structure; and
   drying the solution to form the graphene or graphene oxide sheet on the steel alloy substrate.

2. The method according to claim 1, wherein the method further comprises removing the graphene sheet from the steel alloy substrate.

3. The method according to claim 1, wherein the steel alloy substrate and graphene sheet is allowed to dry in air for up to 32 hours.

4. The method according to claim 1, wherein the drying the solution is performed by applying infrared radiation to the graphene or graphite oxide solution.

5. The method according to claim 1, wherein a bias voltage is applied to the graphene during drying.

6. The method according to claim 1, wherein the solution further comprises an ammonia solution.

7. The method according to claim 6, wherein the ammonia is present at a concentration of up to 1%.

8. The method according to claim 7, wherein the ammonia is present in a concentration in the range from 0.1 g/l to 0.5 g/l.

9. The method according to claim 1, wherein the graphite oxide is in a concentration in the range from 0.1 mg/ml to 100 mg/ml.

10. The method according claim 1, wherein the graphene sheet comprises multiple graphene layers.

11. The method according claim 1, wherein the graphene sheet comprises a single graphene layer.

12. A coated substrate comprising:
    a steel alloy substrate comprising nickel and chromium and having a spheroidized carbon structure; and
    a graphene sheet on the steel alloy substrate.

13. A coated substrate according to claim 12, wherein the graphene sheet has a thickness of about 1 nanometers to about 100 nanometers.

* * * * *